No. 788,333. PATENTED APR. 25, 1905.
F. W. SCOFIELD.
INSECT CATCHER.
APPLICATION FILED SEPT. 27, 1904.

3 SHEETS—SHEET 1.

Witnesses
C. K. Rinkenbach
H. M. Baldwin

Inventor
F. W. Scofield
by
Chandlee & Chandlee
Attorneys

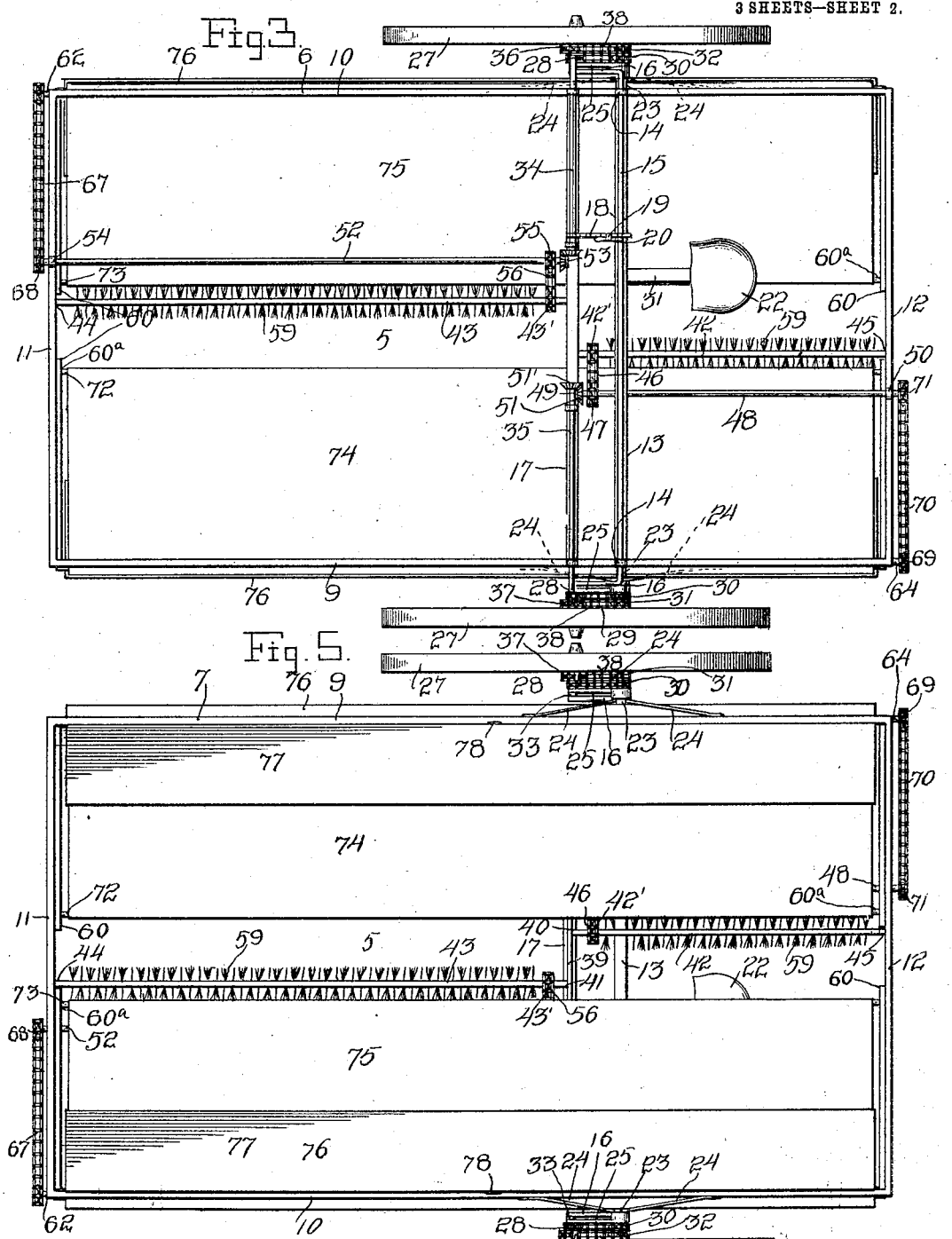

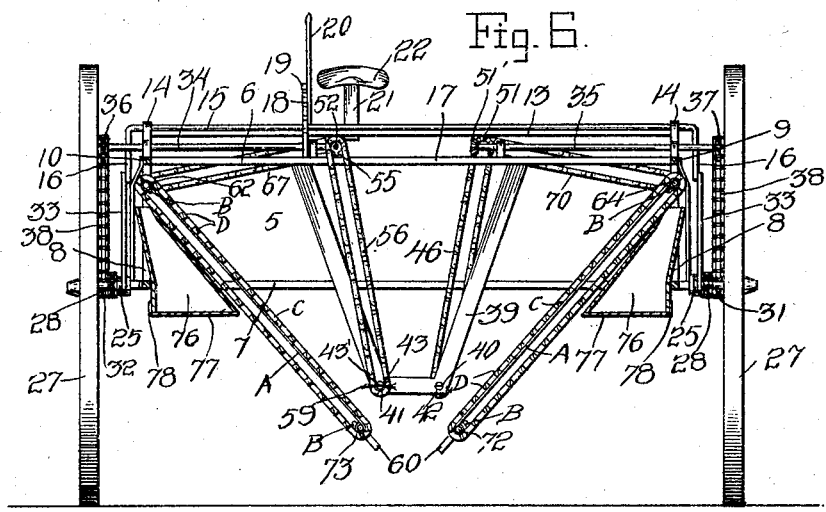
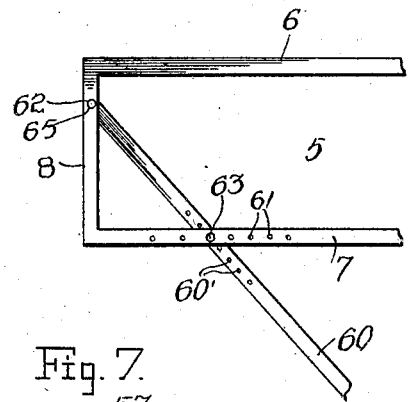
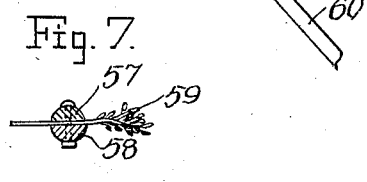

No. 788,333. Patented April 25, 1905.

UNITED STATES PATENT OFFICE.

FLOYD W. SCOFIELD, OF PLYMOUTH, INDIANA.

INSECT-CATCHER.

SPECIFICATION forming part of Letters Patent No. 788,333, dated April 25, 1905.

Application filed September 27, 1904. Serial No. 226,182.

*To all whom it may concern:*

Be it known that I, FLOYD W. SCOFIELD, a citizen of the United States, residing at Plymouth, in the county of Marshall, State of Indiana, have invented certain new and useful Improvements in Insect-Catchers; and I do hereby declare the following to be a full, clear, and exact description of the invention, such as will enable others skilled in the art to which it appertains to make and use the same.

This invention relates to farm implements, and more particularly to insect-catchers, and has for its object to provide an implement by means of which insects may be removed from plants in a quick and efficient manner.

A further object is to provide a machine especially adapted for removing insects from potato-vines and other low plants usually grown in rows, the arrangement of the machine being such that the plants will not be injured thereby.

Another object is to provide an implement which may be readily adjusted to suit different conditions.

Other objects and advantages will be apparent from the following description, and it will be understood that modifications of the specific construction shown may be made, and any suitable materials may be used without departing from the spirit of the invention.

Figure 1:
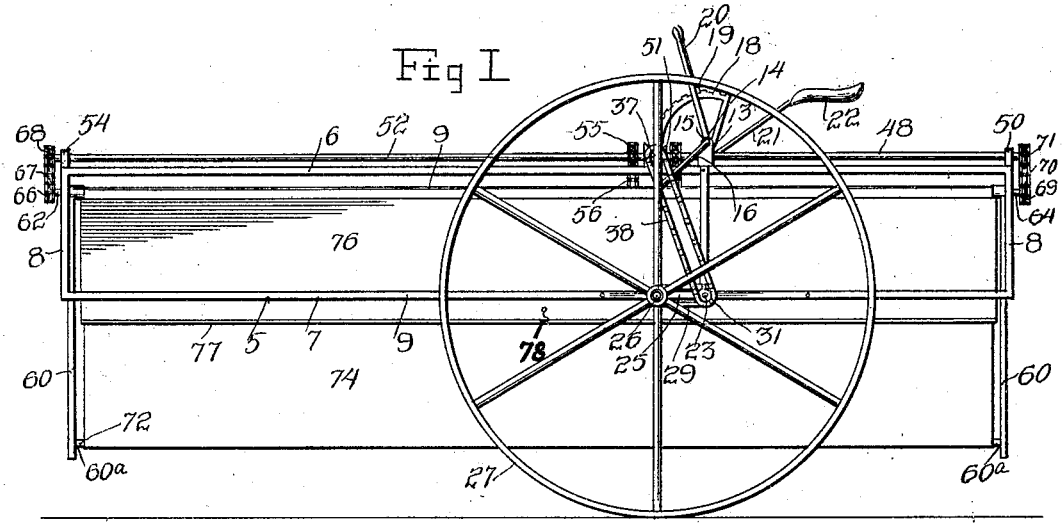
Figure 2:
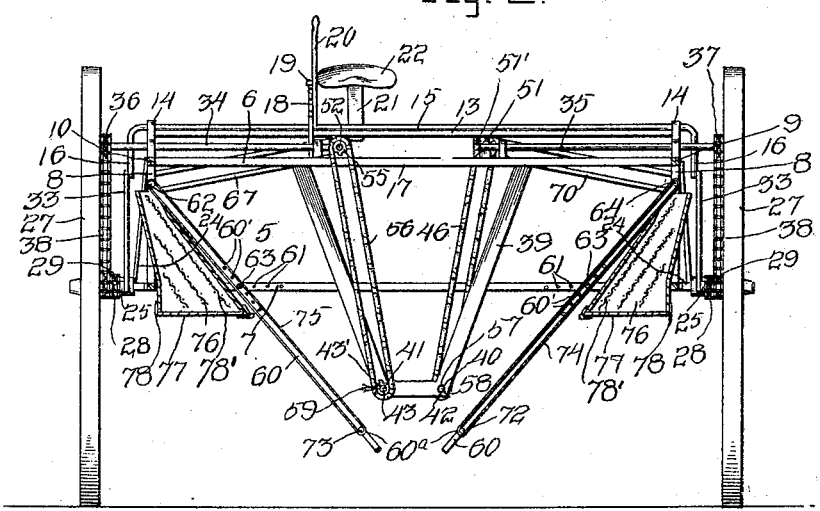

In the drawings forming a portion of this specification, and in which like numerals of reference indicate similar parts in the several views, Figure 1 is a side elevation of the implement. Fig. 2 is a central transverse section. Fig. 3 is a top plan view. Fig. 4 is a detail view showing the means for varying the distance between the lower edges of the elevators. Fig. 5 is a bottom plan view. Fig. 6 is a view showing a modification.

Referring now to the drawings, the present invention comprises a body 5, including upper and lower rectangular frames 6 and 7, connected at their corners by uprights 8. Each of the frames comprises side pieces 9 and 10 and end pieces 11 and 12. Extending transversely of the frame 6, rearwardly of the center thereof, is a beam 13, upon which there is mounted in bearings 14 a shaft 15, extending outwardly beyond the sides of the frame, and at the ends of this shaft are cranks 16, extending at right angles thereto. Extending parallel to the beam 13, forwardly thereof, is a similar beam 17, and connecting the two beams there is a notched segment 18, disposed for engagement by a dog 19, carried by a hand-lever 20, which is connected with the shaft 15 for movement of the latter in its bearings. Adjacent to the hand-lever there is attached to the beam 13 the supporting-spring 21 of a seat 22.

Extending laterally from the frame 7 at points below the outwardly-projecting end portions of the shaft 13 are short rods 23, having suitable braces 24. Pivotally engaged with the rods 23 are short arms 25, the pivotal connection being at one end of these arms, and at their remaining ends the arms are provided with outwardly-extending spindles 26, upon which are mounted ground-wheels 27. The ground-wheels carry sprockets 28, which are connected, by means of chains 29, with other sprockets 30, revolubly mounted upon the rods 23, and connected with each of these sprockets is one of a pair of sprockets 31 and 32, provided for a purpose to be presently described. Links 33 connect the free ends of the arms 25 with the free ends of the cranks 16, and it will thus be apparent that the shaft 13 may be moved to cause vertical movement of the entire body 5.

Revolubly mounted upon the beam 17 are two shafts 34 and 35, having sprockets 36 and 37, which are connected, by means of chains 38, with the sprockets 31 and 32, respectively, so that these shafts 34 and 35 receive motion from the ground-wheels of the implement.

Depending from the beam 17, centrally thereof, is a bracket 39, having bearings 40 and 41 therein, in which are journaled the front and rear ends, respectively, of shafts 42 and 43, the forward end of the latter being journaled in a bearing 44 in the front piece 11 of the lower frame 7, while the rearward end of the shaft 42 is journaled in a bearing 45 in the rear end piece 12 of the same frame.

The shafts 42 and 43 carry sprockets 42' and 43', respectively, the former being connected, by means of chain 46, with the sprocket 47 of a shaft 48, journaled in bearings 49 and 50, carried by the beam 17 and the rear end piece 12 of the upper frame 6, and this shaft 48 is connected, by means of bevel-pinions 51 and 51', with the shaft 35. A shaft 52 is journaled at its ends in bearings 53 and 54 in the beam 17 and the forward end piece 11 of the frame 6, respectively, this shaft carrying a sprocket 55, which is connected, by means of a chain 56, with the sprocket 43', and the shaft 52 has bevel-gear connections with the shaft 34.

The shafts 42 and 43 occupy a common plane, but are spaced laterally from each other, and each of these shafts consists of two portions 57 and 58, which are bolted together and between which are secured wisps of broomcorn or other suitable substances 59, which extend laterally beyond the sides of the shaft, as shown.

Pivoted to the corners of the upper frame 6 are downwardly and inwardly converging rods 60, which coincide in pairs at either side of the body, the lower ends of these rods lying below the plane occupied by the shafts 42 and 43. As shown, the rods 60 at one end of the machine rest against the end piece 12 of the frame 7, while those at the opposite end rest against the end piece 11 thereof, and these end pieces are provided with series of spaced perforations 61. The rods 60 are provided with series of spaced perforations 60', arranged for successive registration with perforations of the series 61 as the rods are moved upon their pivots, and pins 63 are provided for engagement in the perforations thus alined to hold the rods against movement. Means is thus provided for varying the distance between the lower ends of the rods.

The pivotal connection of the rods 60 with the corners of the frame 6 is accomplished through the medium of revolving shafts 62 and 64, mounted in bearings 65 upon the corners of the frame and with which shafts the upper ends of the rods 60 are pivotally connected.

The shaft 62 carries a sprocket 66, which is connected, by means of chain 67, with a sprocket 68, carried by the shaft 52, the shaft 64 carrying the sprocket 69, connected, by means of a chain 70, with a sprocket 71, carried by the shaft 48, and in this manner the shafts 62 and 64 are rotated.

The rods 60 are provided with bearings 60ª in their lower ends, and in the bearings of the rods at either side of the machine there is journaled a shaft, these shafts being indicated at 72 and 73, respectively.

Engaged with the shafts 72 and 64 is an endless carrier 74, a similar carrier being engaged with the shafts 62 and 73. Disposed to receive matter from the carrier 74 and 75 are boxes 76, having hinged bottoms 77, as illustrated, the bottoms having hooks 78, arranged to hold them in position.

In use the machine is driven along a row of potato-vines or other plants, it being understood that the machine is provided with means for attaching horses thereto. It will be readily understood that the shafts 42 and 43 lie one at either side of the row of plants, the height of the implement being adjusted, as described above, to bring the shafts 42 and 43 into position to engage the plants with their wisps 59. The mutually-adjacent faces of the shafts 42 and 43 move upwardly, so that the ends of the wisps 59 first engage the plants and are then moved in the direction of the carriers 74 and 75, the result being that potato-bugs and other insects are removed from the plants by these wisps and are thrown upon the carrier by which they are conveyed to the boxes 76, in which are disposed layers of absorbing material 78', saturated with a suitable insecticide. If desired, however, the absorbent layers may be omitted and a powder or other form of insecticide may be used. The hinging of the bottoms 77 makes possible the easy and quick removal of the dead insects.

In Fig. 6 of the drawings there is shown a modification in which strips of canvas or pieces of sheet metal A are disposed in the positions occupied by the carriers in the previously-described forms. The operating-shafts upon which the carriers are mounted are in this form provided with sprockets B, with which are engaged chains C, having connecting-cleats D, which bear against the canvases or plates A. As the shafts are revolved, the cleats move upwardly over the inner faces of the canvases or plates and downwardly from the rearward faces thereof, collecting the insects in their movement and depositing the latter in the hoppers, as described above.

What is claimed is—

1. An implement of the class described comprising a wheeled body, means for varying the height of the body with respect to the wheels, beaters carried by the body and arranged to lie one at either side of a row of plants, connections between the beaters and the wheels for operation thereby, carriers arranged to receive matter from the beaters, and receptacles disposed to receive matter discharged from the carriers.

2. An implement of the class described, comprising a body, beaters mounted in the body and arranged to lie one at either side of a row of plants, carriers mounted in the body and arranged to receive matter from the beaters, means for varying the position of the carriers with respect to the beaters, and means for operating the beaters and the carriers.

3. An implement of the class described, comprising a body, beaters mounted in the body and arranged to lie one at either side of a row of plants, one of said beaters being disposed rearwardly of the other, adjustable carriers arranged to receive matter from the beaters, and receptacles arranged to receive matter from the carriers.

4. In a farm implement, the combination with a body containing operative mechanism, of stub-shafts carried by the body at either side thereof, arms pivotally engaged with the stub-shafts at one end, and having spindles projecting outwardly at right angles thereto at their remaining ends, ground-wheels rotatably mounted upon the spindles, wheels mounted upon the stub-shafts, connections between said wheels and the ground-wheels, a shaft rotatably mounted upon the body and having cranks at its ends, connections between the cranks and the arms for movement of the latter, a hand-lever connected with the last-named shaft for movement thereof, means for holding said shaft at different points of its movement, and connections between the wheels mounted upon the stub-shaft and the operative mechanism for operation of the latter through movement of the former.

5. An implement of the class described comprising a wheeled body, beaters mounted in the body and arranged to lie one at either side of a row of plants, said beaters comprising two separable sections, and wisps of flexible material secured between said sections, said flexible material extending beyond the sides of the sections, carriers arranged to receive matter from the beaters, and means for operating the beaters and the carriers.

In testimony whereof I affix my signature in presence of two witnesses.

FLOYD W. SCOFIELD.

Witnesses:
   Moses M. Lauer,
   George F. Hitchcock.